(12) United States Patent
Inuzuka

(10) Patent No.: US 7,378,930 B2
(45) Date of Patent: May 27, 2008

(54) MAGNETIC FERRITE AND MAGNETIC DEVICE CONTAINING THE FERRITE

(75) Inventor: Tsutomu Inuzuka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 195 days.

(21) Appl. No.: 10/562,556

(22) PCT Filed: Jul. 13, 2004

(86) PCT No.: PCT/JP2004/010265

§ 371 (c)(1),
(2), (4) Date: Dec. 28, 2005

(87) PCT Pub. No.: WO2005/005341

PCT Pub. Date: Jan. 20, 2005

(65) Prior Publication Data

US 2006/0158293 A1    Jul. 20, 2006

(30) Foreign Application Priority Data

Jul. 14, 2003  (JP) .............................. 2003-196388

(51) Int. Cl.
*H01F 5/00* (2006.01)
(52) U.S. Cl. .................................... 336/200
(58) Field of Classification Search .................. 336/65, 336/83, 200, 232–233; 252/62.6
See application file for complete search history.

(56) References Cited

U.S. PATENT DOCUMENTS

| 3,709,822 | A* | 1/1973 | Ritzen et al. | 252/62.6 |
|---|---|---|---|---|
| 6,940,381 | B2* | 9/2005 | Watanabe et al. | 336/83 |
| 7,202,766 | B2* | 4/2007 | Inuzuka | 336/83 |
| 2004/0130429 | A1* | 7/2004 | Watanabe et al. | 336/233 |

FOREIGN PATENT DOCUMENTS

| JP | 47-7821 | 3/1972 |
|---|---|---|
| JP | 2-062012 | 3/1990 |
| JP | 2-103907 | 4/1990 |
| JP | 5-036517 | 2/1993 |
| JP | 5-055061 | 3/1993 |
| JP | 2001-159668 | 6/2001 |
| JP | 2001-358522 | 12/2001 |

* cited by examiner

*Primary Examiner*—Tuyen T Nguyen
(74) *Attorney, Agent, or Firm*—Wenderoth, Lind & Ponack, L.L.P.

(57) ABSTRACT

A magnetic ferrite operating well in the GHz zone, and a magnetic device of superior high frequency characteristics which uses the magnetic ferrite for its magnetic core.

The magnetic ferrite includes iron oxide, cobalt oxide and zinc oxide as the main components and at least one item selected from among the group consisting of titanium, tantalum, indium, zirconium, lithium, tin and vanadium as the side component.

15 Claims, 4 Drawing Sheets

MAGNETIC FERRITE AND MAGNETIC DEVICE CONTAINING THE FERRITE

This application is a U.S. national phase application of PCT International Application PCT/JP2004/010265.

TECHINICAL FIELD

The present invention relates to a magnetic ferrite used in various kinds of electronic apparatus and a magnetic device which contains the magnetic ferrite.

BACKGROUND ART

Magnetic ferrites have been produced using iron oxide, zinc oxide, nickel oxide, manganese oxide and magnesium oxide as the main components. Namely, Mn—Zn ferrite, Ni—Zn ferrite and Mg ferrite are the basic compositions of ferrites, or the spinel type ferrites. Proportion among the main components and amount of side components added as additive are varied depending on the field of application. Magnetic ferrites have been manufactured in the above-described manner, and used widely in quite a number of electronic circuits operating in the low frequency zone up to the high frequency of approximately 200 MHz.

Magnetic devices used in the electronic circuits are made to demonstrate varieties of characteristics by taking advantage of the following basic functioning rule of the core ferrite:

Complex permeability $\mu=\mu'-\mu''\times i$ ($\mu'$: permeability, $\mu''$: loss factor).

Recently, for use in the frequency zone higher than 200 MHz, a hexagonal crystal ferrite containing iron oxide, barium oxide and strontium oxide as the main components was introduced.

Japanese Patent Unexamined Publication No. H5-36517 discloses an example of the magnetic material containing the hexagonal crystal ferrite.

The above-described conventional magnetic ferrites, however, exhibit the sudden increase of loss factor $\mu''$ at a frequency lower than 1 GHz. This means that the magnetic devices containing conventional magnetic ferrites can be used only in a frequency zone lower than 1 GHz. On the other hand, the high frequency technology is making a remarkable progress in the sector of digital electronic appliances which requires magnetic devices for great numbers.

In order to meet the emerging needs for processing broad band signals at high speed, the circuit components are requested to be capable of handling the signals of still higher frequency.

The present invention addresses the above problem and aims to offer a magnetic ferrite in which the sudden rise of loss factor $\mu''$ occurs only in a frequency zone higher than 1 GHz. The present invention also aims to realize, by making use of the magnetic ferrite, a magnetic device that can be used in the frequency zone higher than 1 GHz.

SUMMARY OF THE INVENTION

A magnetic ferrite which contains iron oxide, cobalt oxide and zinc oxide as the main components, and at least one selected from among the group consisting of titanium, tantalum, indium, zirconium, lithium, tin and vanadium as the side component. The present invention also offers a magnetic device which contains the magnetic ferrite.

DETAILED DESCRIPTION OF PREFERRED EMBODIMENTS

Figure 1:
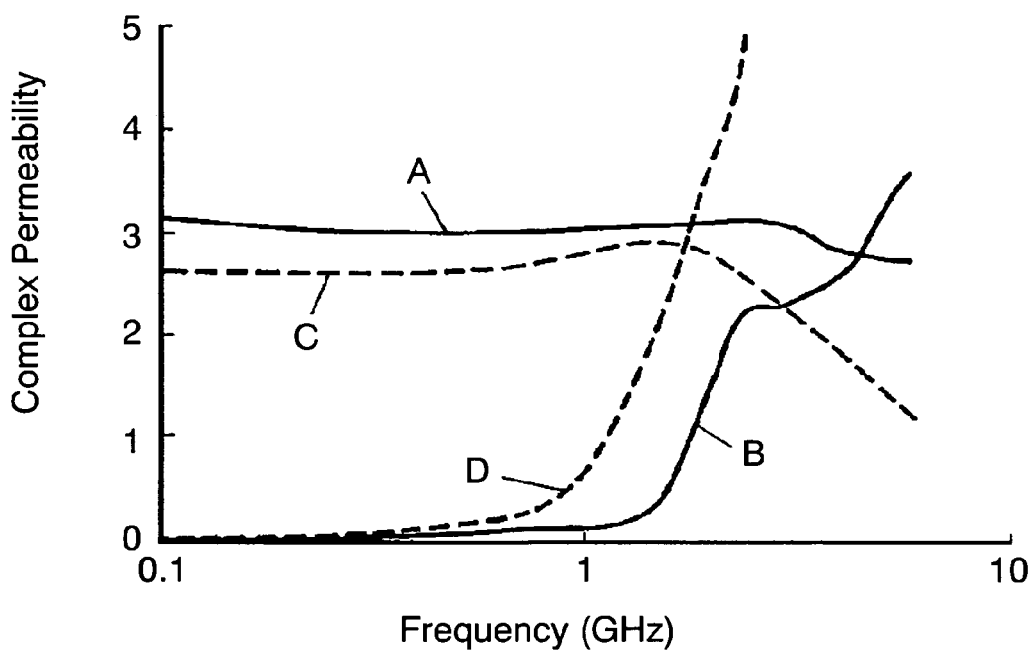
FIG. 1 is a characteristics chart of a magnetic ferrite in accordance with a first exemplary embodiment of the present invention.

A magnetic ferrite in accordance with the present invention and a magnetic device containing the magnetic ferrite are described below referring to the drawings.

The drawings have been made for the purpose of presenting the concept of invention; it is to be noted that they do not exhibit precise dimensions and positioning of component parts.

First Exemplary Embodiment

Figure 2:
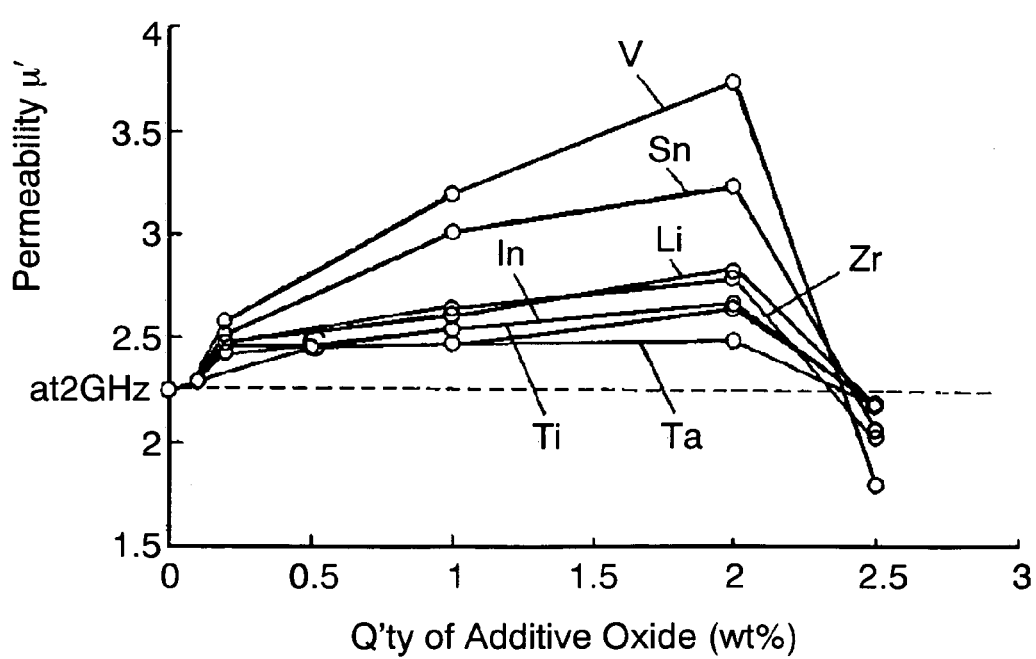
FIG. 2 is a characteristics chart showing the relationship between the magnetic permeability and the quantity of side component added as the additive in a first exemplary embodiment.

First embodiment is described referring to FIG. 1 and FIG. 2.

Provide iron oxide powder, zinc oxide powder and cobalt oxide power, which are the readily available starting materials for a magnetic ferrite of the present invention, for the following ratio: $Fe_2O_3:ZnO:CoO=48.0:6.5:45.5$ in mol %.

Add an appropriate amount of pure water to the powders and ball-mill them, and then dry it at 120° C. to produce a mixed powder. Calcine the mixed powder at 900° C., crush it with a planetary ball mill until the largest grain diameter is reduced to be less than 8 µm. Thus, a calcined ferrite powder is provided. Add $SnO_2$ for 1 wt % to the calcined ferrite powder and mix them. Add water solution of PVA (polyvinyl alcohol) for an appropriate amount and knead it to produce a granulation powder whose average grain diameter is approximately 20 µm.

Form the granulation powder into a ring shape, and sinter it at a certain temperature in order to bring it dense, for example at 1200-1300° C. Thus, a toroidal core is provided (this core is referred to as Sample 1 of the present invention).

For the purpose of comparison, another toroidal core is also provided using a hexagonal crystal ferrite having substantially the same permeability (this is referred to as Comparison 1). FIG. 1 compares characteristics of the two toroidal cores. In FIG. 1, curves A and B represent μ' and μ", respectively, of Sample 1 of the present invention; while, C and D represent μ' and μ", respectively, of Comparison 1. As seen in FIG. 1, Comparison 1 exhibits a sudden rise of the loss factor μ" at the neighborhood of 0.8 GHz (curve D).

Whereas, the sudden rise frequency of Sample 1 shifts towards the higher frequency side, to the neighborhood of 1.5 GHz (curve B).

Furthermore, Curve A indicates that it maintains permeability μ' to be approximately 3 up to the vicinity of 6 GHz. Namely, the magnetic characteristics shown by the one produced in accordance with the present invention indicate that it can be used in the GHz zone.

More toroidal core samples were also manufactured, by the same procedure as described above, with iron oxide, zinc oxide and cobalt oxide mixed as per the proportions shown in Table 1, adding $SnO_2$ for 2 wt % as the side component (Samples 1-12 of the present invention).

Magnetic characteristics of the cores thus provided are shown in Table 1.

TABLE 1

| | E | F | G | H | μ' | μ" |
|---|---|---|---|---|---|---|
| | | mol % | | wt % | at 1 GHz | |
| Sample 1 | 48 | 45.5 | 6.5 | 2 | 3.1 | 0.05 |
| Sample 2 | 50 | 47 | 3 | 2 | 2 | 0.15 |
| Sample 3 | 50 | 42 | 8 | 2 | 3.5 | 0.15 |
| Sample 4 | 45 | 52 | 3 | 2 | 2 | 0.06 |
| Sample 5 | 44 | 42 | 14 | 2 | 2 | 0.14 |
| Sample 6 | 42 | 52 | 6 | 2 | 2 | 0.07 |
| Sample 7 | 42 | 44 | 14 | 2 | 2 | 0.15 |
| Sample 8 | 51 | 44 | 5 | 2 | 1.8 | 0.2 |
| Sample 9 | 48 | 50 | 2 | 2 | 1.6 | 0.04 |
| Sample 10 | 48 | 41 | 11 | 2 | 1.8 | 0.2 |
| Sample 11 | 42 | 55 | 3 | 2 | 1.5 | 0.05 |
| Sample 12 | 42 | 42 | 16 | 2 | 1.8 | 0.2 |
| Comparison 2 | 41 | 49 | 10 | | 1.8 | 0.26 |

E: $Fe_2O_3$
F: CoO
G: $SnO_2$

From the results shown in Table 1, it is understood that the magnetic ferrite Samples 1-12 of the present invention have the higher permeability μ' and the smaller loss factor μ". It is further understood that the advantages are more significant within the inside of a region surrounded by the lines representing the composition ratios of Samples 2-7.

The above results indicate that the magnetic ferrites provided in accordance with the present invention have superior high frequency characteristics for use in the GHz zone.

FIG. 2 shows the change of permeability μ' at 2 GHz demonstrated by calcined ferrite powder having the same composition as Sample 1, caused as the result of adding various side components. As understood from FIG. 2, permeability μ' goes higher along with the increasing quantity of the added side component until it reaches 2 wt %; the highest improvement demonstrated in the characteristic is as high as approximately 60%. However, the increase in permeability μ' stays to be very small when the amount of additive is 0.1 wt %; whereas, when side component is added for 2.5 wt %, permeability μ' decreases to be lower than that without any additive of side component. From the results demonstrated above, it is understood that what is preferred is to add at least any one selected from among the group consisting of titanium, tantalum, indium, zirconium, lithium, tin and vanadium, as side component for an amount of 0.2-2.0 wt % in the oxide conversion.

Further, more toroidal core samples (Samples 13-19) are manufactured through the same procedure as described above using the same calcined ferrite powder as Sample 1 as the base material, adding a plurality of side components as shown in Table 2. For the purpose of comparison, another toroidal core sample (Comparison 3) is produced using Sample 1's calcined ferrite powder without adding any side component.

Their magnetic characteristics are shown in Table 2.

TABLE 2

| | Additive 1 | Q'ty wt % | Additive 2 | Q'ty wt % | Additive 3 | Q'ty wt % | Permeability at 2 GHZ |
|---|---|---|---|---|---|---|---|
| Sample 13 | $SnO_2$ | 1 | TiO2 | 1 | — | 0 | 2.67 |
| Sample 14 | $SnO_2$ | 1 | $In_2O_3$ | 1 | — | 0 | 2.76 |
| Sample 15 | $SnO_2$ | 1 | $Ta_2O_5$ | 1 | — | 0 | 2.48 |
| Sample 16 | $V_2O_3$ | 1 | $ZrO_2$ | 1 | — | 0 | 3.02 |
| Sample 17 | $V_2O_3$ | 1 | $LiO_2$ | 1 | — | 0 | 3.25 |
| Sample 18 | $V_2O_3$ | 1 | $LiO_2$ | 0.5 | $SnO_2$ | 0.5 | 3.10 |
| Sample 19 | $SnO_2$ | 1 | $TiO_2$ | 0.5 | $ZrO_2$ | 0.5 | 2.70 |
| Comparison 3 | — | 0 | — | 0 | — | 0 | 2.26 |

Referring to Table 2, Samples 13-19, which contain two or more of side components added simultaneously, also show the increased permeability μ' at 2 GHz, as compared with Comparison 3 in which no side component is added. It seems that these side components work to accelerate the sintering behavior of main components; even when they are dosed in complexity there are no obstructive effects caused against the sintering process. The complex dose of side components exhibited similar results also among those whose composition in the main components, viz. iron oxide, zinc oxide and cobalt oxide, is the same as one of Samples 2-7 of the present invention.

It has also been confirmed that the same advantages are generated when an oxide or a carbonate of different valency, for example, CoO, $Co_2O_3$, $Co_2O_4$, $CoCO_3$, is used as material for the main component or the additive side component.

Second Exemplary Embodiment

Second embodiment is described with reference to FIG. 3 and FIG. 4.

Figure 3:
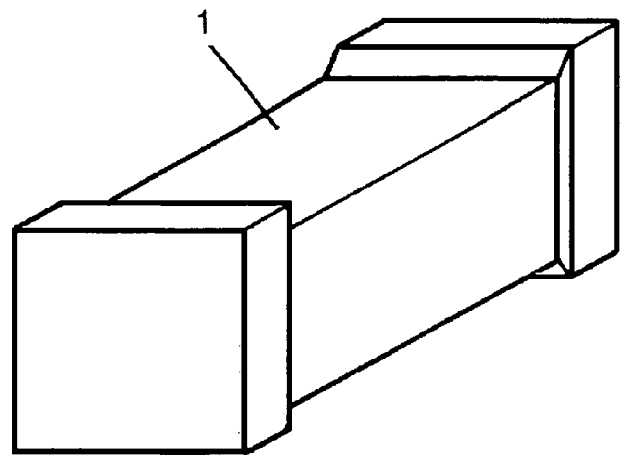
FIG. 3 is a perspective view used to describe the structure of an insulator for an inductance device, which device being an example of magnetic device in accordance with a second embodiment of the present invention.
Figure 4:
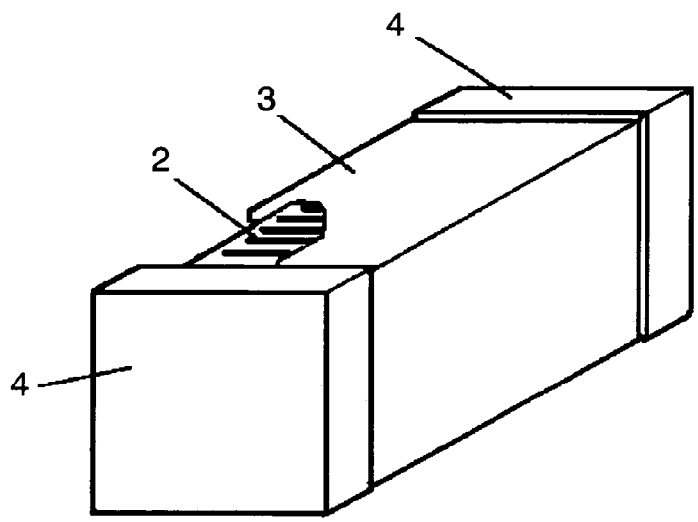
FIG. 4 is a partially cut-away perspective view of an inductance device, or an example of magnetic device, in a second embodiment.

In FIG. 3 and FIG. 4, insulator 1 is a magnetic ferrite core whose composition is as shown in Table 3. Insulator 1 is provided with conductor coil 2 formed with copper, silver or the like conductor material. Surface of conductor coil 2 is covered with insulation layer 3 made of resin or other material. External electrode 4 is provided for two pieces, at respective ends of conductor coil 2. A finished inductance device is thus provided.

Method of manufacturing, as well as the structure and the electrical characteristic, of the above-configured inductance device is described below.

Prepare calcined ferrite powder which has the same composition as Sample 1 of the present invention. Add an oxide listed in Table 3 to the calcined ferrite powder as the side component, and knead these together in the same procedure as in the first embodiment to provide a granulation powder.

Fill a mold with the granulation powder, and treat it under certain processing conditions to produce a certain specific shape. And then sinter it at a certain temperature for making it dense, for example 1200-1300° C. Insulator 1 is thus provided.

Form conductor coil 2 on separator 1 by winding a wire or other means, and then provide insulation layer 3 using an insulating resin or an insulating inorganic material. Thus a finished inductance device as shown in FIG. 4 is completed (Samples 20-26 of the present invention).

For the purpose of comparison, another inductance device (Comparison 4) is manufactured using alumina for insulator 1, and still other inductance device (Comparison 5) using hexagonal crystal ferrite for insulator 1.

Characteristics of these inductance devices are shown in Table 3.

TABLE 3

| | Additive | | Inductance value | Frequency of Peak Q-value |
|---|---|---|---|---|
| | Name | Q'ty wt % | (nH) at 2 GHz | (GHz) |
| Sample 20 | $TiO_2$ | 2 | 4.3 | 2.2 |
| Sample 21 | $In_2O_3$ | 2 | 4.5 | 2.0 |
| Sample 22 | $Ta_2O_5$ | 2 | 4.5 | 1.9 |
| Sample 23 | $ZrO_2$ | 2 | 4.8 | 1.9 |
| Sample 24 | $LiO_2$ | 2 | 4.8 | 1.8 |
| Sample 25 | $SnO_2$ | 2 | 5.5 | 1.6 |
| Sample 26 | $V_2O_3$ | 2 | 6.4 | 1.3 |
| Comparison 4 | — | — | 2.0 | 3.2 |
| Comparison 5 | — | — | 4.0 | 0.8 |

From the results shown in Table 3, it is understood that Samples 20-26 exhibit the greater inductance values along with the increasing permeability μ', as compared with Comparison 4. Namely, the Samples of the present invention exhibit significant improvements with respect to the characteristics required for an inductance device for use in a high frequency circuit.

On the other hand, Comparison 5, an inductance device, shows the peak Q frequency at the neighborhood of 0.8 GHz. In the frequency higher than 1 GHz, the loss goes to be too high to be used in GHz zone. Whereas, respective Samples 20-26 of the present invention show the peak Q frequency in 1-3 GHz zone.

Namely, each of these Samples of the present invention is an inductance device that can be used in the GHz zone.

Instead of providing insulator 1 by compressing a granulation powder, it can be manufactured by laminating the green sheets and then cutting or punching the laminate into certain desired size. Those insulators manufactured by the latter method exhibit the same effects.

Instead of forming conductor coil 2 by winding a wire, it can be provided by first forming a layer over the whole surface making use of a plating process or a thin-film technology and then cutting the layer spirally by means of a laser beam or an abrasive stone. Those conductor coils formed by the latter method exhibit the same effects.

Furthermore, insulation layer 3 may include a magnetic material mixed therein.

The inductance value will improve a step further with this configuration. A preferred magnetic material to be mixed in insulation layer 3 is the magnetic ferrite powder in accordance with the present invention.

Since the Q value goes higher along with an increasing grain diameter of the magnetic ferrite powder, the most preferred grain diameter is 45 μm, or larger.

In order to realize an inductance device at a certain specific inductance value, at a maximized inductance value, or in a reduced device size, a conductor coil may be provided around the above-described magnetic ferrite. When a magnetic ferrite has the higher permeability μ', a device can be designed either to generate the higher inductance value or to attain the smaller device size.

When a magnetic ferrite used has the smaller loss factor μ", the Q value can be greater. Therefore, the greater Q value at an operating frequency represents that it is a superior inductance device for high frequency application.

Third Exemplary Embodiment

Third embodiment is described with reference to FIG. 5 and FIG. 6.

Figure 5:
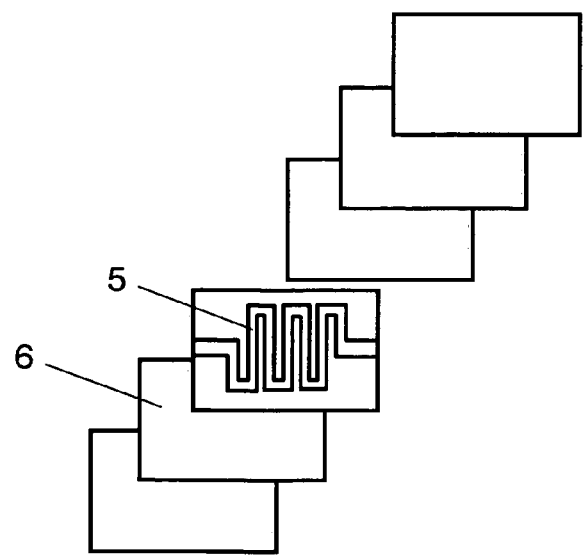
FIG. 5 illustrates the laminated structure of an impedance device, which device being other example of magnetic device in accordance with a third embodiment.
Figure 6:
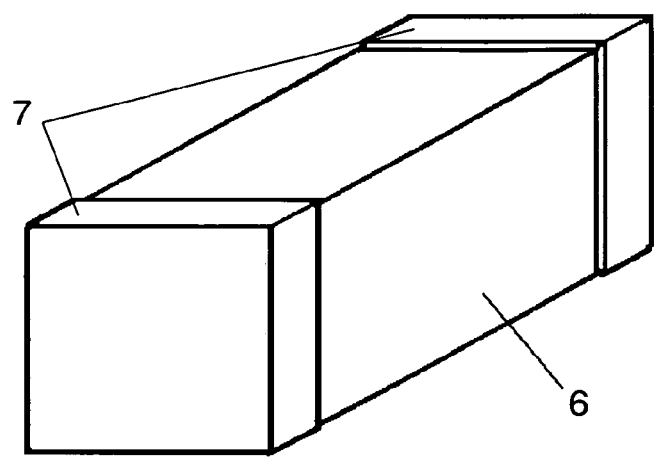
FIG. 6 is a perspective view of an impedance device; which device being other example of magnetic device in a third embodiment.

In FIG. 5 and FIG. 6, meandering conductor 5 is formed with platinum, palladium, etc. Conductor 5 is sandwiched by laminated magnetic ferrite green sheets. Magnetic ferrite 6 is provided in this way. Magnetic ferrite 6 is an insulation member. At both ends of magnetic ferrite 6 are two external electrodes 7 which are coupled with respective ends of conductor 5 disposed within the inside. Thus a finished impedance device is provided.

As described in the above, an impedance device which is used as an anti-noise component is manufactured by covering the signal line, viz. conductor 5, with magnetic ferrite 6. Defining a certain frequency at which magnetic ferrite 6's loss factor μ" shows sudden rise as the cutoff frequency, the impedance value of an impedance device selectively increases at a frequency higher than the cutoff frequency. As the result, noises containing a frequency component higher than the cutoff frequency are removed. When magnetic ferrite 6 has the higher permeability μ', a device can be designed to exhibit the higher impedance value. Thus it implements a superior impedance device.

A method for manufacturing the above-configured impedance device is written below.

Mix iron oxide, zinc oxide and cobalt oxide in conformity with the following mixing ratio in terms of mol %: $Fe_2O_3$:ZnO:CoO=48.0:6.5:45.5.

Add an appropriate amount of pure water and ball-mill them. Dry it at 120° C. to provide a mixed powder. Calcine the mixed powder at 900° C., and crush it with a planetary ball mill until the largest grain diameter is reduced to be smaller than 8 μm. Thus a calcined ferrite powder is produced. Add a side component listed in Table 4 as an additive to the calcined ferrite powder.

Further add an appropriate amount of butyral resin and butyl acetate, and ball-mill it to have them well dispersed. Thus a ferrite slurry is produced.

Apply the ferrite slurry by means of a doctor blade process to produce a ferrite green sheet. On the ferrite green sheet, print a pattern of conductor 5 with Pt paste. Laminate the ferrite green sheet having the printed conductor 5 and the ferrite green sheets without conductor 5 pattern for pluralities until it makes a certain desired thickness. And then, cut the laminated sheet into individual pieces of a molded chip. Sinter the molded chip at 1200-1300° C. to produce a sintered magnetic ferrite which contains conductor 5 in the inner layer. At both ends of the sintered magnetic ferrite, provide two external electrodes 7 coupled with respective ends of conductor 5.

A finished impedance device as shown in FIG. 6 is thus manufactured (Samples 27-33 of the present invention).

For the purpose of comparison, another impedance device (Comparison 6) is manufactured using hexagonal crystal ferrite. Electrical characteristics of these impedance devices are compared in Table 4.

From the results shown in Table 4, it is understood that Samples 27-33 of the present invention show higher cutoff frequency (a frequency at which the impedance becomes 10Ω), as compared with Comparison 6. This means that the Samples represent the impedance devices that can be used as the noise filter in the GHz zone.

Since the magnetic ferrite used has the higher permeability μ', impedance value goes higher making the device a superior impedance device.

The shape of conductor 5's Pt pattern formed in the inside is not limited to the meandering shape. For example, a spiraling coil shape can be provided by laminating ferrite green sheets and making use of their via holes.

TABLE 4

| | Additive | | Cutoff Frequency GHz | Impedance Value (Ω) at 2 GHz |
|---|---|---|---|---|
| | Name | Q'ty Wt % | | |
| Sample 27 | $TiO_2$ | 2 | 1.0 | 98 |
| Sample 28 | $In_2O_3$ | 2 | 1.0 | 104 |
| Sample 29 | $Ta_2O_5$ | 2 | 1.0 | 104 |
| Sample 30 | $ZrO_2$ | 2 | 1.0 | 110 |
| Sample 31 | $LiO_2$ | 2 | 1.0 | 111 |
| Sample 32 | $SnO_2$ | 2 | 1.3 | 127 |
| Sample 33 | $V_2O_3$ | 2 | 1.0 | 147 |
| Comparison 6 | — | — | 0.5 | 30 |

In this case, the impedance value deteriorates if distance between the end of spiral conductor coil 5 and external electrode 7 is short.

Therefore, the distance should be long enough; preferably 200 μm or longer.

Conductor 5 may be formed with either Pd or an alloy of Pt and Pd. However, it is preferred to use either Pt or Pd in view of the conductance.

Fourth Exemplary Embodiment

Fourth embodiment is described with reference to FIG. 7 and FIG. 8.

Figure 7:
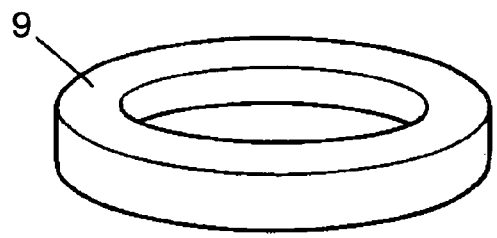
FIG. 7 is a perspective view of a ring-shaped core in accordance with a fourth embodiment.
Figure 8:
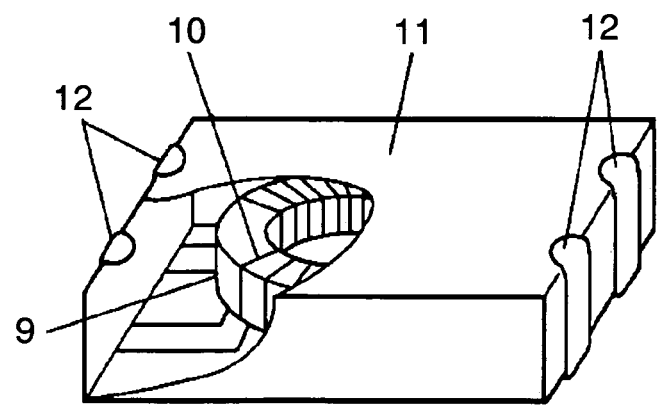
FIG. 8 is a partially cut-away perspective view of a common mode noise filter, which filter being other example of magnetic device in a fourth embodiment.

In FIG. 7 and FIG. 8, ring-shaped core 9 is formed with a magnetic ferrite, and provided on the surface with two conductor coils 10 made of copper, silver, etc.

Formed over the surface of two conductor coils 10 is insulation layer 11 made of a resin or the like material. Four external electrodes 12 are provided to be coupled with respective terminals of two conductor coils 10. A finished common mode noise filter has such a structure.

In a common mode noise filter used for the differential transmission line in standard electronic circuits, ring magnetic ferrite core 9 is wound around with two conductor coils 10 in the same direction.

The filter removes common mode component by taking advantage of an enhanced magnetic coupling between the two differential transmission lines which is due to the magnetic ferrite's permeability μ'. The smaller the loss factor μ" of magnetic ferrite, the smaller is the loss of differential mode, or loss at the signal level to be transmitted. Thus it makes a superior common mode noise filter. With the above-described structure, a superior common mode noise filters operating in the GHz zone can be realized by using a magnetic ferrite in accordance with the present invention for ring shape core 9.

A method for manufacturing the above-configured common mode noise filter is described below.

Add a side component listed in Table 5 as the additive to the main components of Sample 1, and process it through the same procedure as in the first embodiment to provide a granulation powder.

Shape the granulation powder into the form of a ring, and sinter it at 1200-1300° C. to produce ring shape core 9. Wind a double wire around ring shape core 9 to provide two conductor coils 10.

Mold it with a resin material to form insulation layer 11, and provide external electrodes 12 for coupling with the terminals of two conductor coils 10.

In this way, a common mode noise filter as illustrated in FIG. 8 is manufactured (Samples 34-40 of the present invention). Also manufactured for the comparative study is a common mode noise filter (Comparison 7), which uses hexagonal crystal ferrite for ring shape core 9.

Table 5 compares characteristics of these common mode noise filters.

TABLE 5

| | Additive | | Coupling Coefficient |
|---|---|---|---|
| | Name | Q'ty wt % | |
| Sample 34 | $TiO_2$ | 2 | 0.83 |
| Sample 35 | $In_2O_3$ | 2 | 0.88 |
| Sample 36 | $Ta_2O_5$ | 2 | 0.88 |
| Sample 37 | $ZrO_2$ | 2 | 0.89 |
| Sample 38 | $LiO_2$ | 2 | 0.91 |
| Sample 39 | $SnO_2$ | 2 | 0.90 |
| Sample 40 | $V_2O_3$ | 2 | 0.92 |
| Comparison 7 | — | — | 0.50 |

From the results shown in Table 5, it is understood that Samples 34-40 exhibit, as compared with Comparison 7, higher coupling coefficient because of the higher permeability μ' at 1 GHz and the smaller loss factor μ".

Although ring core 9 wound around with coils has been molded with insulation layer 11 to facilitate the surface mounting operation, two conductor coils 10 may be connected direct onto a substrate, with the resin molding eliminated, for generating the same effects.

Fifth Exemplary Embodiment

Fifth embodiment is described with reference to FIG. 9 and FIG. 10.

Figure 9:
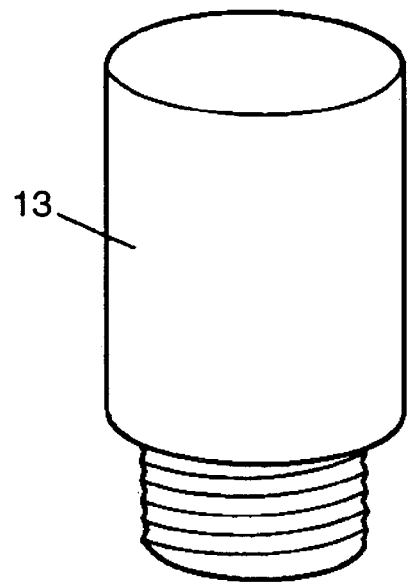
FIG. 9 is a perspective view of a ferrite core for antenna device, which device being other example of magnetic device in a fifth embodiment.
Figure 10:
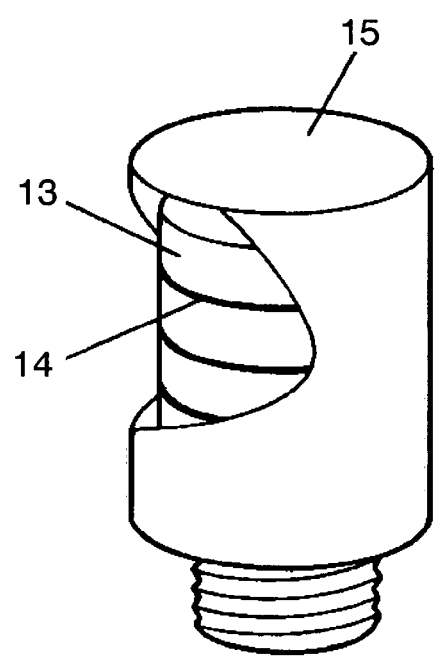
FIG. 10 is a partially cut-away perspective view of an antenna device, which device being other example of magnetic device in a fifth embodiment.

In FIG. 9 and FIG. 10, ferrite core 13 is made with a magnetic ferrite. Provided on the surface of ferrite core 13 is conductor coil 14 formed of copper, silver, etc. Conductor coil 14 is covered over the surface with insulation layer 15 of a resin or the like material. A finished antenna device has such a structure.

A method for manufacturing the above-configured antenna device is described below.

Add a side component listed in Table 6 as the additive to the same main components as Sample 1 to provide a granulation powder through the same procedure as in the first embodiment.

Form the granulation powder into a rod shape, and sinter it at 1200-1300° C. And then grind it into a shape as illustrated in FIG. 9 to produce ferrite core 13 of an antenna device. Cover the entire surface of ferrite core 13 with a metal of low ohmic value, such as copper, silver, etc., by a plating process or other method. Cut the plated surface spirally with a laser beam to form conductor coil 14.

Mold ferrite core 13, which has conductor coil 14 provided on the surface, with a resin to provide insulation layer 15. In this way, a finished antenna device as illustrated in FIG. 10 is completed (Samples 41-47 in the present invention).

For the comparative study, an antenna device (Comparison 8) is manufactured using a resin core of the like figure, and an antenna device (Comparison 9) which uses a hexagonal crystal ferrite for ferrite core 13.

Table 6 compares their radiation loss as well as the advantage in size with the dimensions of the resin-core device (Comparison 8) as 100.

It is understood from the results shown in Table 6 that among the antenna devices in the present invention, the greater the permeability $\mu'$ of magnetic ferrite the smaller is the size of antenna device as compared with that which has a resin-made core.

The antenna device which uses hexagonal crystal ferrite for ferrite core 13 has too great radiation loss to determine its size precisely.

TABLE 6

| | Additive | | Antenna Size | Radiation |
|---|---|---|---|---|
| | Name | Q'ty wt % | relative value (%) | Loss −dB |
| Sample 41 | $TiO_2$ | 2 | 83 | −1.7 |
| Sample 42 | $In_2O_3$ | 2 | 81 | −1.9 |
| Sample 43 | $Ta_2O_5$ | 2 | 81 | −1.8 |
| Sample 44 | $ZrO_2$ | 2 | 79 | −1.6 |
| Sample 45 | $LiO_2$ | 2 | 79 | −1.8 |
| Sample 46 | $SnO_2$ | 2 | 73 | −1.6 |
| Sample 47 | $V_2O_3$ | 2 | 71 | −1.7 |
| Comparison 8 | — | — | 100 | −0.52 |
| Comparison 9 | — | — | — | −8.8 |

It is also understood that the antenna device which contains a hexagonal crystal ferrite exhibits great radiation loss, whereas that of the antenna devices in accordance with the present invention is small enough to be used in 2 GHz zone.

Antenna devices can be connected on a circuit by means of either soldering or calking. However, it is preferred to provide the device with a screwing portion for mounting, in order to ensure a sufficient mounting strength.

The screwing portion can be provided by means of a powder compression process using a separate type mold, instead of a cutting process.

As to the material used for plating, Ag, Cu, Au, Al, Ni, Pt, Pd, etc. may be used. However, it is preferred to use Ag or Cu in view of the conductivity.

Conductor coil 14 may be provided by winding a wire or punching a metal plate into a coil shape. Either method generates the same effects.

A thin film of non magnetic material may be formed between the surface of ferrite core 13 and conductor coil 14.

The antenna device may be molded with a resin material, or covered with a resin-mold cap.

Since it is based on the wave length shortening effects due to permeability $\mu'$, the same advantage can of course be produced on a patch antenna or other type antennas, besides the above helical type antenna device.

A magnetic ferrite in the present invention includes iron oxide, cobalt oxide and zinc oxide as the main components and at least one selected from among the group consisting of titanium, tantalum, indium, zirconium, lithium, tin, and vanadium as the side component. This magnetic ferrite exhibits the sudden increase of loss factor $\mu''$ at a frequency higher than 1 GHz, and loss factor $\mu''$ above 1 GHz is small and permeability $\mu'$ is high.

The composition of a magnetic ferrite in accordance with the present invention resides within the inside of a region surrounded by the ingredient lines representing following mixing ratios of iron oxide, cobalt oxide and zinc oxide, in terms of $Fe_2O_3$, CoO and ZnO conversion in mol %: 50:47:3, 50:42:8, 45:52:3, 44:42:14, 42:52:6 and 42:44:14. A magnetic ferrite in accordance with the present invention demonstrates superior characteristics in the high frequency zone.

A magnetic ferrite in the present invention contains at least one selected from among the group consisting of titanium, tantalum, indium, zirconium, lithium, tin and vanadium as the side component for 0.2-2.0 wt % in the oxide conversion. By mixing constituent components in conformity with the specified proportions, a magnetic ferrite above-recited realizes a magnetic ferrite of higher permeability $\mu'$.

A magnetic device in the present invention includes a rod shape insulator, a conductor coil formed spirally on the insulator, an insulation layer covering the conductor coil and two external electrodes coupled with the conductor coil. It uses a magnetic ferrite above-recited for the insulator, making the magnetic device an inductance device. The inductance device exhibits large Q even at 1 GHz or higher, and enables to make the internal conductor line shorter.

A magnetic device in the present invention includes a magnetic insulation member, a meandering conductor coil provided in the inside of the magnetic insulation member and two external electrodes coupled with the conductor coil. It uses a magnetic ferrite above-recited for the magnetic insulation member, making the magnetic device an impedance device. Since it can determine low-pass filter's cutoff frequency in a zone higher than 1 GHz, and provided with a great impedance value, it is an impedance device which efficiently cuts the noise.

A magnetic device in the present invention includes a ring shape core, two conductor coils wound in the same direction on the ring core, an insulation layer covering the conductor coils and four external electrodes coupled with the conductor coils. It uses a magnetic ferrite above-recited for the ring core, making the magnetic device a common mode noise filter. The common mode noise filter can be designed with the transmitting signal's frequency band set at 1 GHz or higher, and exhibits a high coupling coefficient in the GHz band.

A magnetic device in the present invention includes a ferrite core, a conductor coil wound spirally around the core and an insulation layer covering the conductor coil. It uses a magnetic ferrite above-recited for the ferrite core, making the magnetic device an antenna device. This realizes a compact antenna device for use in 1-3 GHz zone.

INDUSTRIAL APPLICABILITY

A magnetic ferrite in the present invention can be used in magnetic devices which are mounted on electronic circuits operating in the GHz zone.

The invention claimed is:

1. A magnetic ferrite comprising iron oxide, cobalt oxide and zinc oxide as main components and at least one member selected from the group consisting of titanium, tantalum, indium, zirconium, lithium, tin and vanadium, wherein the magnetic ferrite exhibits a sudden increase of loss factor $\mu''$ only in a frequency zone higher than 1 GHz.

2. The magnetic ferrite of claim 1, wherein a proportion of mixing among iron oxide, cobalt oxide and zinc oxide in terms of $Fe_2O_3$, CoO and ZnO converted in mol % is inside of a region surrounded by ingredient lines representing the following ratios: 50:47:3, 50:42:8, 45:52:3, 44:42:14, 42:52:6 and 42:44:14.

3. The magnetic ferrite of claim 1, wherein an amount of at least one member selected from the group consisting of titanium, tantalum, indium, zirconium, lithium, tin and vanadium is 0.2-2.0 wt % in terms of oxide conversion.

4. An inductance device which is a magnetic device comprising a rod shape insulator, a conductor coil formed spirally around the insulator, an insulation layer covering the conductor coil and two external electrodes coupled with the conductor coil, wherein the insulator is a magnetic ferrite recited in claim 1.

5. An impedance device which is a magnetic device comprising a magnetic insulation member, a meandering conductor coil provided inside the magnetic insulation member and two external electrodes coupled with the conductor coil, wherein the magnetic insulation member is a magnetic ferrite recited in claim 1.

6. A common mode noise filter which is a magnetic device comprising a ring shape core, two conductor coils wound in the same direction on the ring core, an insulation layer covering the conductor coils and four external electrodes coupled with the conductor coils, wherein the ring core is a magnetic ferrite recited in claim 1.

7. An antenna device which is a magnetic device comprising a ferrite core, a conductor coil wound spirally around the ferrite core and an insulation layer covering the conductor coil, wherein the ferrite core is a magnetic ferrite recited in claim 1.

8. An inductance device which is a magnetic device comprising a rod shape insulator, a conductor coil formed spirally around the insulator, an insulation layer covering the conductor coil and two external electrodes coupled with the conductor coil, wherein the insulator is a magnetic ferrite recited in claim 2.

9. An inductance device which is a magnetic device comprising a rod shape insulator, a conductor coil formed spirally around the insulator, an insulation layer covering the conductor coil and two external electrodes coupled with the conductor coil, wherein the insulator is a magnetic ferrite recited in claim 3.

10. An impedance device which is a magnetic device comprising a magnetic insulation member, a meandering conductor coil provided inside the magnetic insulation member and two external electrodes coupled with the conductor coil, wherein the magnetic insulation member is a magnetic ferrite recited in claim 2.

11. An impedance device which is a magnetic device comprising a magnetic insulation member, a meandering conductor coil provided inside the magnetic insulation member and two external electrodes coupled with the conductor coil, wherein the magnetic insulation member is a magnetic ferrite recited in claim 3.

12. A common mode noise filter which is a magnetic device comprising a ring shape core, two conductor coils wound in the same direction on the ring core, an insulation layer covering the conductor coils and four external electrodes coupled with the conductor coils, wherein the ring core is a magnetic ferrite recited in claim 2.

13. A common mode noise filter which is a magnetic device comprising a ring shape core, two conductor coils wound in the same direction on the ring core, an insulation layer covering the conductor coils and four external electrodes coupled with the conductor coils, wherein the ring core is a magnetic ferrite recited in claim 3.

14. An antenna device which is a magnetic device comprising a ferrite core, a conductor coil wound spirally around the ferrite core and an insulation layer covering the conductor coil, wherein the ferrite core is a magnetic ferrite recited in claim 2.

15. An antenna device which is a magnetic device comprising a ferrite core, a conductor coil wound spirally around the ferrite core and an insulation layer covering the conductor coil, wherein the ferrite core is a magnetic ferrite recited in claim 3.

* * * * *